Feb. 6, 1968 L. BENTZMAN 3,368,071
REFLECTOR ASSEMBLY FOR A PHOTOCOPY MACHINE
Filed May 17, 1965 2 Sheets-Sheet 2

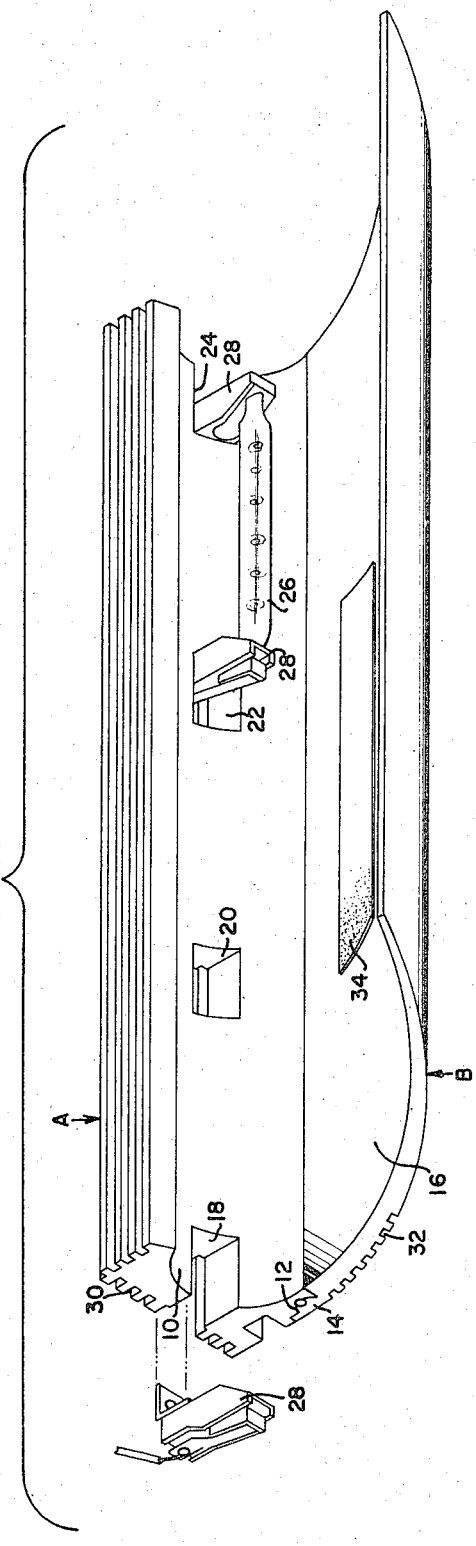
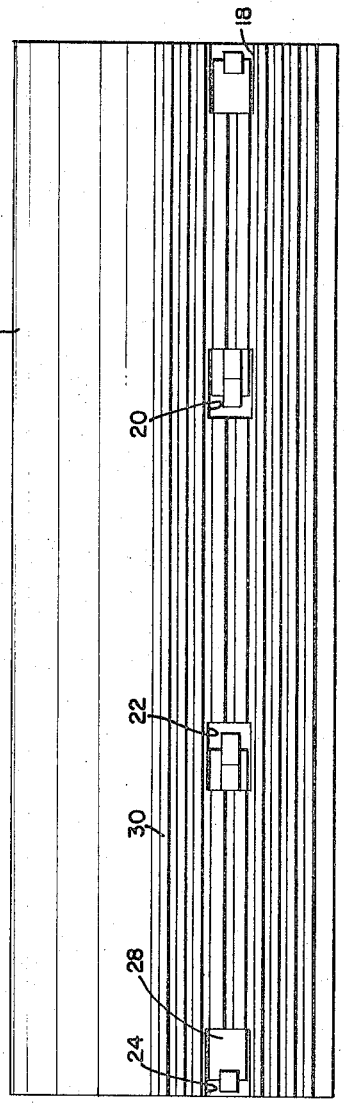

INVENTOR.
LOUIS BENTZMAN
BY Karl L. Spivak
ATTORNEY

United States Patent Office 3,368,071
Patented Feb. 6, 1968

3,368,071
REFLECTOR ASSEMBLY FOR A PHOTOCOPY MACHINE
Louis Bentzman, Levittown, Pa., assignor to Quik-Chek Electronics and Photo Corporation, Philadelphia, Pa., a corporation of Delaware
Filed May 17, 1965, Ser. No. 456,083
7 Claims. (Cl. 240—41.1)

ABSTRACT OF THE DISCLOSURE

A reflecting assembly system comprising a generally semi-circular, specular reflecting surface, a diffuse reflector adjoined to the specular reflector, and adjacent reflecting surfaces and masked surfaces as required to direct a substantially even light pattern over a surface to be photocopied.

---

This invention relates in general to photo copy machines and is more particularly directed to the light reflecting assembly provided interiorly of the equipment for directing an adequate quantity of light upon a surface to be copied to permit proper functioning of the reproduction processes.

It is an object of this invention to provide an improved reflector assembly of the type set forth.

In designing photo copy equipment wherein interior space is at a premium, modern office copy equipment does not provide room for complicated lens and reflecting systems heretofore employed. Despite the physical limitations imposed, it is of utmost importance that an adequate level of illumination be directed evenly upon the surface to be copied.

It is therefore an object of this invention to provide a compact reflector assembly of high efficiency.

It is therefore a further object of this invention to provide a compact reflector assembly and light source to assure adequate, even illumination over the entire surface to be copied.

It is another object of this invention to provide a compact reflector assembly incorporating external reflecting surfaces to compensate at areas of natural light fall off.

It is another object of this invention to provide a reflector assembly utilizing the principles of specular and diffuse reflections.

It is another object of this invention to provide a novel reflector assembly capable of producing satisfactory overall illumination at relatively low wattage levels.

It is another object of this invention to provide a novel reflector assembly which reflects the light over the surface to be copied or projected at an angle which is carefully calculated to prevent light beams and reflections from entering the machine lens system other than by way of the copy.

It is another object of this invention to provide a novel reflector assembly incorporating reflector masking facilities in areas where light rays may overlap and complement each other.

It is another object of this invention to provide a novel reflector assembly comprising a circular specular reflector and a companion diffuse reflector, the curve of said diffuse reflector being carefully plotted to cover the paper to be copied evenly with reflected light and to adequately dispense the light over the copy to avoid hot spots.

It is another object of this invention to provide a novel reflector assembly capable of evenly illuminating a surface to be copied from a position at an oblique angle from the said surface.

It is another object of this invention to provide a reflector assembly and light source capable of producing maximum light in areas of fall off of illumination characteristic of a projection optical system without the use of a condenser.

It is a further object of this invention to provide a novel reflector assembly that is rugged in design, inexpensive in manufacture and trouble free upon operation.

Other objects and a fuller understanding of the invention will be had by referring to the following description and claims of a preferred embodiment thereof, taken in conjunction with the accompanying drawing wherein like reference characters refer to similar parts throughout the several views and in which:

FIG. 1 is a prespective view partially exploded, of a reflector assembly in accordance with the instant invention.

FIG. 2 is a side elevational view thereof.

Figure 3:
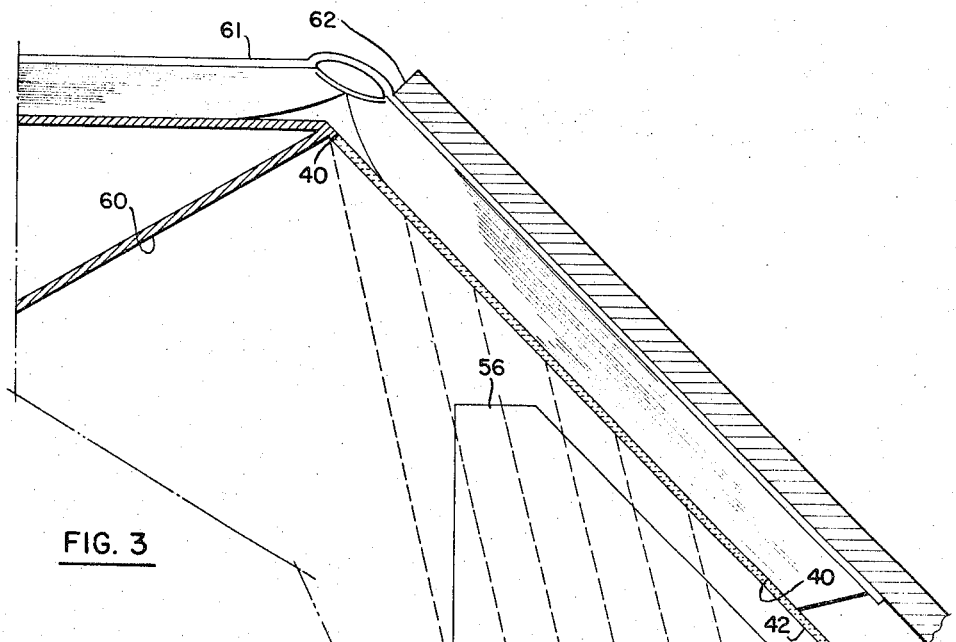
FIG. 3 is a cross sectional diagrammatic view showing the reflection of light rays upon a surface to be copied.

Although specific terms are used in the following description for the sake of clarity, these terms are intended to refer only to the particular structure of my invention selected for illustration in the drawings and are not intended to define or limit the scope of the invention.

Referring now to the drawings, I show a highly polished reflector base generally designated A capable of eighty-five to ninety-five percent reflectivity. The inner reflecting surface 10 is extruded from aluminum stock to a cylindrical configuration and is then highly polished to a substantially specular surface, that is, a surface wherein the angle between the reflected ray and the normal to the surface equals the angle between the incident ray and the normal to the surface.

The reflector base A terminates forwardly in a transverse socket 12 which slidingly engages the transverse plug 14 of the diffuse reflector B to form a continuous unitary reflecting surface. The reflectors A and B receive the light rays from a pair of elongated conventional photo copy lamps 26, 27 and reflect the rays evenly over the entire surface to be copied as best seen in FIG. 3.

Referring now to FIG. 1, the cylindrical reflector base A is rearwardly pierced with the spaced pairs of openings 18, 20 and 22, 24 to receive the lamp holding sockets 28 therethrough. The sockets support the lamps 26, 27 at the focal point 36 of the reflector base A and are suitably transversely spaced to provide for maximum light in the outward areas of greatest fall off of illumination. The top edge 38 of the reflector base A defines an angle of twelve degrees from the vertical to permit light from the lamps 26, 27 to strike the top edge 40 of the target glass 42 without reflection and to simultaneously prevent direct beams and reflections from entering the lens system (not shown) of a photo copy machine 44 except by way of the copy. A plurality of spaced grooves 30 transversely depress the external surface 46 of the reflector base to provide increased area for heat dissipation purposes and to minimize the possibility of reflector distortion caused by the heat generated in the operation of the photo lamps 26, 27.

The surface of the diffuse reflector B has been carefully developed by plotting the curve to fully disperse the light rays evenly over the surface of the image containing paper 48. The reflecting surface 16 is polished to be capable of eighty-five to ninety-five percent reflectivity for specular reflection and is also transversely grooved or otherwise treated as required for diffuse reflection. It is well-known that combinations of surfaces may be made to obtain nearly any desired flux distribution and so the principle of lighting a surface evenly from one side thereof may be varied by changing the curvature or character of the surface slightly. However, the general arrangement would remain the same and so all such modifications are considered to fall within the scope of this invention.

In developing the surface of the diffuse reflector B, the base 50 has been constructed so that a line tangent thereto lies thirteen degrees below the horizontal. The peak 52 of the deflector B has been constructed so that a line tangent thereto lies seventy-eight degrees above the horizontal. The reflecting surface 16 between its base 50 and peak 52 may be plotted as required to evenly distribute light, bearing in mind that the distribution is a function not only of the surface contour, but also of the character of the surface. It was found desirable to construct the surface 16 as a compound reflector, that is, capable of both diffuse and specular reflection, to prevent secondary images from forming and being directed into the photo machine lens system.

Figure 4:
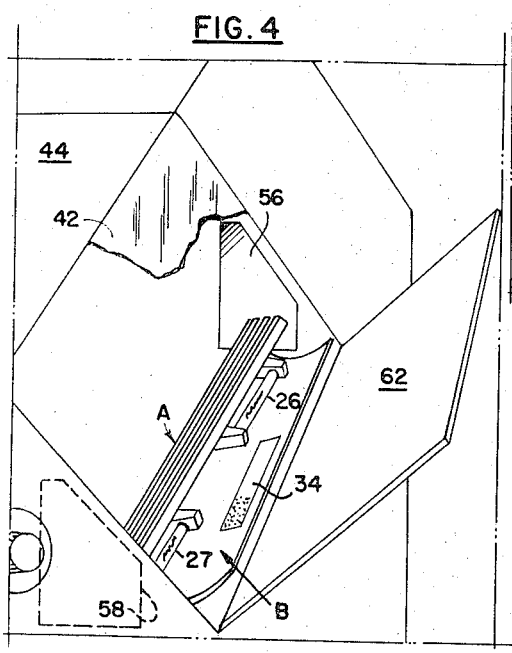
FIG. 4 is a perspective view showing the assembly positioned within a photo copy machine.

As best seen in FIG. 4, a strip of matte finish masking tape 34 transversely covers a medial portion of the reflector B to equalize the light in the area of overlap where the light rays from the photo lamps 26, 27 complement each other. A portion of the diffuse reflector exterior surface 52 is depressed in a plurality of spaced grooves 32 to provide an extended surface for heat dissipation purposes. Specular side reflectors 56, 58 may be provided transversely of the reflectors A, B to augment the light in the corners as required and to compensate for the natural fall off of a lens system on the outer edges thereof. Similarly, if found necessary, a top transverse reflector 60 may be employed to correct for any fall off of reflected light at the top of the copy.

Referring now to FIG. 3, I show the rays of light from a source at the center or focus of a circular surface contour being reflected and redirected by the said surface through the source itself. Thus it is seen that a portion of the light rays are reflected by the reflector A back through the focal point 36 to fall directly upon the surface of the paper 48 to be copied. In addition, other portions of the light rays pass through the focal point 36 and fall upon the surface 16 of the reflector B. In turn, these rays are directed upon the paper surface 48 to augment the light and thus aid in developing a clear image. A lens system (not shown) may then be focused upon the paper surface in any well known manner as required in the photo copy process.

I have thus provided a unique reflector assembly that permits the entire surface of the image carrying paper to be adequately illuminated from one side thereof. This principle is of particular importance when designing a book copier as indicated in FIG. 3. A book 61 may be applied over the glass surface of a copy machine with the binding overlying the top edge thereof. In such an arrangement, the margin of the book must be maintained near the top of the machine to prevent objectionable pulling or rising caused by the stress of the binding material. By so locating the material to be copied with respect to the photo copy machine, no room within is remaining near the top and so it is physically impossible to locate a second light source in this vicinity to assure overall illumination. By the unique arrangement of a specular reflector and a cooperating diffuse reflector located at one end of the surface to be illuminated, I have thus conveniently and efficiently solved this problem.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:
1. In a reflecting system reflecting light upon an image containing surface, the combination of
   specular reflecting means,
      a portion of said means reflecting light upon the said surface;
   diffuse reflecting means,
      said means receiving reflected light from said specular reflecting means;
   light means located at the focal point of said specular reflecting means;
   transverse reflecting means outwardly spaced from the said specular and diffuse reflecting means;
   and masking means affixed to the said diffuse reflecting means said masking means being spaced from and axially aligned with respect to the said light means, and said masking means being positioned on the said diffuse reflecting means in the area of maximum concentration of light rays from the said light means,
   whereby light rays from the said light means are directed evenly over the said image containing surface.

2. The invention of claim 1 wherein said specular reflecting means are substantially semi-circular in cross section.

3. The invention of claim 1 wherein said specular reflecting means are substantially semi-circular in cross section, and wherein said means have a portion of the open surface thereof facing the said image containing surface.

4. The invention of claim 1 wherein said specular reflecting means and said diffuse reflecting means reflect light towards the said image containing surface from a position below a plane perpendicular to the said surface and passing through one edge thereof.

5. The invention of claim 1 wherein said specular reflecting means and said diffuse reflecting means reflect light towards the said image containing surface from a position below a plane perpendicular to the said surface and passing through one edge thereof, and wherein light rays reflected by the said specular reflecting means and light rays reflected by the said diffuse reflecting means are superimposed upon the said surface.

6. The invention of claim 1 wherein the said specular reflecting means and said diffuse reflecting means include heat dissipating means.

7. The invention of claim 1 wherein the said specular reflecting means and said diffuse reflecting means include heat dissipating means, said means including a plurality of external spaced grooves, said grooves being transversely machined in the said reflecting means.

References Cited

UNITED STATES PATENTS

| 3,162,373 | 12/1964 | Biggs et al. | 240—1.2 |
| 3,268,718 | 8/1966 | Ostensen | 240—41.35 |

FOREIGN PATENTS

| 1,183,764 | 7/1959 | France. |
| 21,901 | 9/1911 | Great Britain. |
| 219,001 | 7/1925 | Great Britain. |

NORTON ANSHER, *Primary Examiner.*

M. H. HAYES, *Assistant Examiner.*